United States Patent
Jayanti et al.

(10) Patent No.: US 12,099,731 B2
(45) Date of Patent: Sep. 24, 2024

(54) TIERED MEMORY DATA STRUCTURES AND ALGORITHMS FOR DYNAMIC SEARCHING VIA BALANCED BINARY SEARCH TREES

(71) Applicant: VMware LLC, Palo Alto, CA (US)

(72) Inventors: Siddhartha Visveswara Jayanti, Hanover, NH (US); Marcos Kawazoe Aguilera, Mountain View, CA (US); Naama Ben David, Mountain View, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/158,989

(22) Filed: Jan. 24, 2023

(65) Prior Publication Data
US 2024/0248622 A1 Jul. 25, 2024

(51) Int. Cl.
*G06F 12/00* (2006.01)
*G06F 3/06* (2006.01)
*G06F 16/22* (2019.01)

(52) U.S. Cl.
CPC .......... *G06F 3/0631* (2013.01); *G06F 3/0611* (2013.01); *G06F 3/0685* (2013.01); *G06F 16/2246* (2019.01)

(58) Field of Classification Search
CPC ...... G06F 9/5016; G06F 12/02; G06F 12/023; G06F 2212/1008; G06F 2212/1016; G06F 15/167; G06F 2209/548; G06F 9/5005; G06F 9/5083; G06F 9/54; G06F 9/544
See application file for complete search history.

(56) References Cited

PUBLICATIONS

Amanda Raybuck, Tim Stamler, Wei Zhang, Mattan Erez, Simon Peter, "HeMem: Scalable Tiered Memory Management for Big Data Applications and Real NVM", In ACM Symposium on Operating Systems Principles, Oct. 2021.
D. Porobic, E. Liarou, P. Tozun, and A. Ailamaki, "ATraPos: Adaptive transaction processing on hardware islands", In International Conference on Data Engineering, pp. 688-699, Mar. 2014.
I. Calciu, J. E. Gottschlich, and M. Herlihy, "Using delegation and elimination to implement a scalable NUMA-friendly stack", In USENIX Workshop on Hot Topics in Parallelism, Jun. 2013.

(Continued)

*Primary Examiner* — Yong J Choe
(74) *Attorney, Agent, or Firm* — Quarles & Brady LLP

(57) ABSTRACT

In one set of embodiments, a computer system can receive a request to insert or delete a key into or from a plurality of keys maintained by a dynamic search data structure, where the dynamic search data structure is implemented using a balanced binary search tree (BBST) comprising a plurality of nodes corresponding to the plurality of keys, where a first subset of the plurality of nodes are stored in the first memory tier, and where a second subset of the plurality of nodes are stored in the second memory tier. The computer system can further execute the request to insert or delete the key, where the executing results in a change in height of at least one node in the plurality of nodes. In response to the executing, the computer system can move one or more nodes in the plurality of nodes between the first and second memory tiers, the moving causing a threshold number of nodes of highest height in the BBST to be stored in the first memory tier.

21 Claims, 4 Drawing Sheets

(56) References Cited

PUBLICATIONS

Irina Calciu, Siddhartha Sen, Mahesh Balakrishnan, Marcos K. Aguilera, "Black-box Concurrent Data Structures for NUMA Architectures", ACM SIGPLAN Notices, vol. 52, Issue 4, Apr. 8, 2017, pp. 207-221.

J. S. Vitter, "External memory algorithms and data structures: dealing with massive data", In ACM Computing Surveys, vol. 33, Issue 2, Jun. 2001, pp. 209-271.

Kai Wu, Yingchao Huang, and Dong Li, "Unimem: Runtime Data Managementon Non-Volatile Memory-Based Heterogeneous Main Memory", In Proceedings of the International Conference for High Performance Computing, Networking, Storage and Analysis (SC '17), Denver, CO.

Subramanya R. Dulloor, Amitabha Roy, Zheguang Zhao, Narayanan Sundaram, Nadathur Satish, Rajesh Sankaran, Jeff Jackson, and Karsten Schwan, "Data Tiering in Heterogeneous Memory Systems", In Proceedings of the Eleventh European Conference on Computer Systems (EuroSys '16), Apr. 18, 2016/.

Sudarsun Kannan, Ada Gavrilovska, Vishal Gupta, and Karsten Schwan, "HeteroOS: OS Design for Heterogeneous Memory Management in Datacenter", In Proceedings of the 44th Annual International Symposium on Computer Architecture (ISCA '17), Jun. 24, 2017.

Vishal Gupta, Min Lee, Karsten Schwan. HeteroVisor: Exploiting Resource Heterogeneity to Enhance the Elasticity of Cloud Platforms. ACM SIGPLAN Notices, vol. 50, Issue 7, Jul. 2015, pp. 79-92.

Wei Wei, Dejun Jiang, Sally A. McKee, Jin Xiong, and Mingyu Chen., "Exploiting Program Semantics to Place Data in Hybrid Memory", In Proceedings of the 2015 International Conference on Parallel Architecture and Compilation (PACT).

Z. Metreveli, N. Zeldovich, and M. F. Kaashoek. "CPHash: a cache-partitioned hash table", In ACM Symposium on Principles and Practice of Parallel Programming, pp. 319-320, Feb. 25, 2012.

Zi Yan, Daniel Lustig, David Nellans, and Abhishek Bhattacharjee, "Nimble Page Management for Tiered Memory Systems", In Proceedings of the Twenty-Fourth International Conference on Architectural p. 7 of 11 Support for Programming Languages and Operating Systems (ASPLOS '19), Apr. 13, 2019.

TIERED MEMORY DATA STRUCTURES AND ALGORITHMS FOR DYNAMIC SEARCHING VIA BALANCED BINARY SEARCH TREES

BACKGROUND

Unless otherwise indicated, the subject matter described in this section is not prior art to the claims of the present application and is not admitted as being prior art by inclusion in this section.

Modern computer systems use a tiered memory architecture that comprises a hierarchy of different memory types, referred to as memory tiers, with varying cost and performance characteristics. For example, the highest byte-addressable memory tier of this hierarchy typically consists of dynamic random-access memory (DRAM), which is fairly expensive but provides fast access times. The lower memory tiers of the hierarchy include slower but cheaper (or at least more cost efficient) memory types such as persistent memory, remote memory, and so on.

Because of the differences in performance across memory tiers, it is desirable for applications to place more frequently accessed data in higher (i.e., faster) tiers and less frequently accessed data in lower (i.e., slower) tiers. However, many data structures and algorithms that are commonly employed by applications today, particularly in the problem domain of searching, are not designed with tiered memory in mind. Accordingly, these existing data structures and algorithms fail to adhere to the foregoing rule, resulting in suboptimal performance.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

Embodiments of the present disclosure are directed to data structures and algorithms that may be implemented by a computer system with a tiered memory architecture (i.e., a tiered memory system) for efficiently performing dynamic searching using a balanced binary search tree. Generally speaking, these data structures and algorithms, referred to herein as tiered memory data structures/algorithms, ensure that most of the memory accesses needed to carry out the dynamic search task are directed to data maintained in higher (i.e., faster) memory tiers and conversely few memory accesses are directed to data maintained in lower (i.e., slower) memory tiers. This results in improved performance over standard dynamic search approaches that assume a single tier of memory.

1. Example Tiered Memory System and Problem Statement

Figure 1:
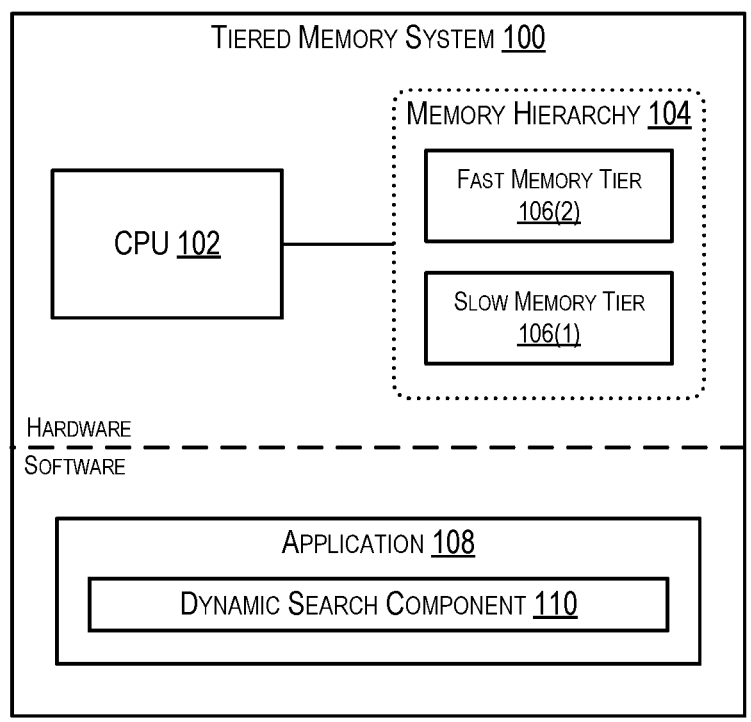
FIG. 1 depicts an example tiered memory system.

FIG. 1 is a simplified block diagram of an example tiered memory system 100 in which the techniques of the present disclosure may be implemented. As shown, tiered memory system 100 includes in hardware a central processing unit (CPU) 102 that is coupled with a memory hierarchy 104. Memory hierarchy 104 is a logical collection of memory tiers that are ordered from highest to lowest. Each memory tier represents a different type of physical memory present in tiered memory system 100 and accessed by CPU 102, with higher memory tiers consisting of faster but more expensive (and thus scarcer) memory and lower memory tiers consisting of slower but cheaper (and thus more abundant) memory.

In the example of FIG. 1, memory hierarchy 104 includes two memory tiers: a fast memory tier 106(2) having an associated size m and cost per memory access c, and a slow memory tier 106(1) having an associated size M>m and cost per memory access C>c. For example, fast memory tier 106(2) may comprise DRAM, which offers memory access times on the order of tens of nanoseconds but is typically limited in size to several hundred gigabytes. In contrast, slow memory tier 106(1) may comprise persistent memory (also known as non-volatile RAM or NVRAM), which offers slower memory access times on the order of hundreds of nanoseconds but can feasibly reach capacities of several terabytes or more. In alternative embodiments, memory hierarchy 104 may comprise further memory tiers beyond 106(2) and 106(1).

In addition to CPU 102 and memory hierarchy 104, tiered memory system 100 includes in software an application 108 comprising a dynamic search component 110. Dynamic search component 110 is tasked with solving the dynamic search problem, which involves implementing a data structure D (sometimes referred to herein as a dynamic search data structure) that supports the following operations:

1. D←Initialize( ) create a new instance of data structure D with an empty set of keys.
2. D.Insert(k): if key k is not in data structure D, insert k into D.
3. D.Delete(k): if key k is in data structure D, delete k from D.
4. D.HasKey(k): return whether key k is in data structure D.

In some embodiments data structure D may also store a value for each key, in which case D is referred to as a dictionary and supports an additional GetVal(k) operation that returns a value v associated with key k if k is in D. However, for simplicity, it is assumed that data structure D stores only keys, with the understanding that values can be easily added.

One standard algorithm for solving the dynamic search problem assumes a single tier of memory and involves implementing data structure D using a balanced binary search tree (BBST) T that is maintained in that single memory tier. As known in the art, a binary search tree for a set of keys K is a rooted binary tree that has a node identified by each key k $\in$ K and satisfies the following property: each node k in the tree is larger than all the nodes in its left subtree and smaller than the nodes in its right subtree. A BBST is a binary search tree that automatically keeps its height (i.e., the number of tree levels from root to leaves) proportional to log n (where n=|K|) in the face of arbitrary key insertions and deletions. Because the Insert, Delete, and HasKey operations are performed as spine traversals on BBST T, the standard algorithm ensures that each of these operations takes just O(log n) time.

Figure 2:
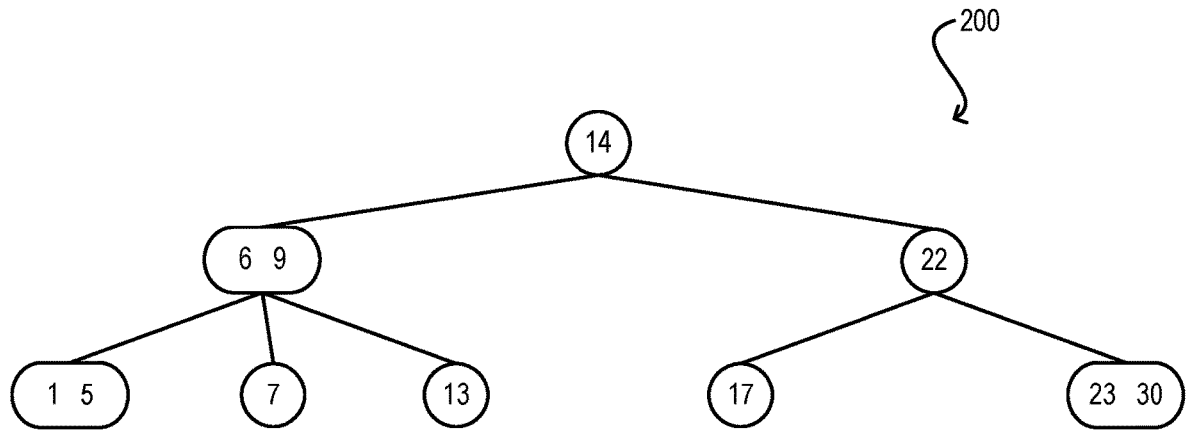
FIG. 2 depicts an example 2-3 tree.

There are a number of different types of BBSTs such as AVL trees, red-black trees, and left-leaning red-black trees (LLRBTs). To provide context for LLRBTs, a 2-3 tree is a balanced (non-binary) search tree with nodes that are either identified by a single key and have two children (i.e., 2-nodes) or are identified by two keys and have three children (i.e., 3-nodes). For a 2-node identified by a key k, all keys in the left subtree are smaller than k and all trees in the right subtree are larger than k. For a 3-node identified by keys (k,l), the following properties hold: (1) k<l, (2) all keys in the left subtree are smaller than k, (3) all keys in the middle subtree are between k and l, and (4) all keys in the right subtree are larger than l. FIG. 2 depicts an example 2-3 tree 200 in accordance with these properties.

Figure 3:
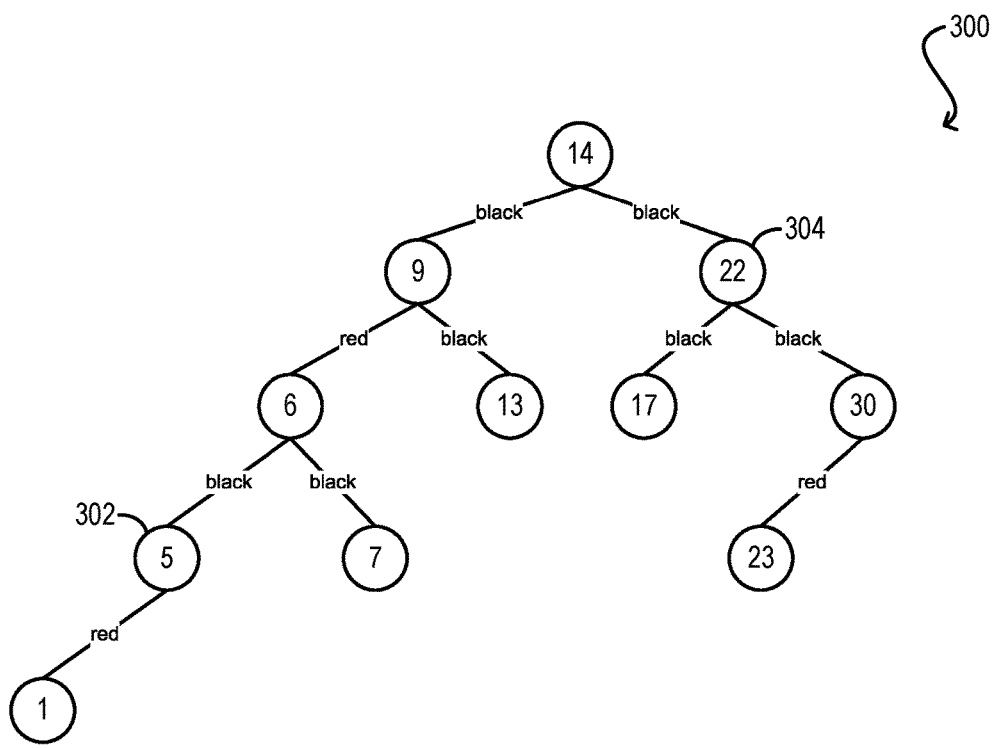
FIG. 3 depicts an example left-leaning red-black tree corresponding to the 2-3 tree of FIG. 2.

A LLRBT is a binary tree representation of a 2-3 tree that colors each edge (i.e., link between nodes) red or black. In particular, a 2-3 tree is transformed into a LLRBT by transforming every 3-node (k,l) with children left, center, right into a tree with five nodes k, l, left, center, and right where larger key l is at the top with left child k and right child right, and where k's children are left and center. All edges in this transformed representation are black, except for the (left leaning) edge between k and l which is assigned red. For example, FIG. 3 depicts an LLRBT 300 that corresponds to 2-3 tree 200 of FIG. 2. One advantage of using a LLRBT over other types of BBSTs for implementing dynamic search is that it is significantly easier to program the Insert and Delete operations, which involves performing node rotations in order to ensure that balance is maintained in the tree.

If the size of BBST T (i.e., |K|, denoted herein as n) is guaranteed to remain less than or equal to the size of fast memory tier 106(2) of tiered memory system 100 (i.e., m), dynamic search component 110 can simply leverage the standard algorithm using fast memory tier 106(2) and thereby implement dynamic searching in a time-optimal manner. In other words, dynamic search component 110 can operate as if system 100 consists of a single memory tier corresponding to fast tier 106(2) and can perform all memory accesses required by the operations of the dynamic search problem against that tier, resulting in a total time complexity of O (c log n).

However, for purposes of the present disclosure, it is assumed that n can grow to be greater than the size of fast memory tier 106(2) (i.e., m) and less than the size of slow memory tier 106(1) (i.e., M)), with a constant (or super-constant) excess factor α≡n/m indicating the proportion of the data size to the fast memory tier size. As a result, dynamic search component 110 is constrained by that fact that it may not be able to fit the entirety of BBST T within fast memory tier 106(2); instead, component 110 must place at least some fraction of the tree nodes in slow memory tier 106(1) once n exceeds m. The question raised by this setting (and answered by the present disclosure) is therefore the following: how can dynamic search component 110 arrange/manipulate the data for BBST T across fast and slow memory tiers 106(2) and 106(1) (as part of, e.g., executing dynamic search operations such as Insert and Delete) to best take advantage of the faster speed of fast memory tier 106(2) and thus accelerate the dynamic search task? Or stated another way, how can dynamic search component 110 arrange/manipulate the data for BBST T across fast and slow memory tiers 106(2) and 106(1) to achieve a speed up over simply implementing the standard algorithm in slow memory tier 106(1) (which has a total time complexity of O (C log n))?

2. Solution Overview

Figure 4:
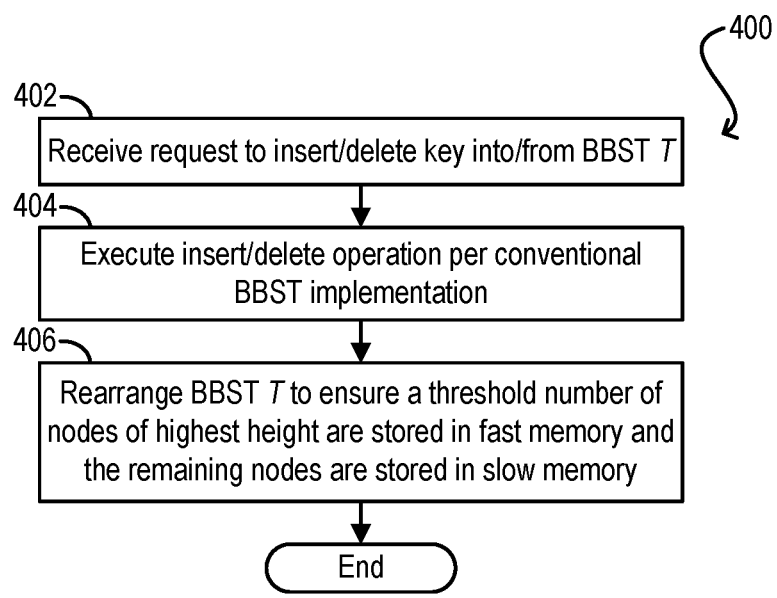
FIG. 4 depicts a flowchart for implementing tiered memory dynamic search using a balanced binary search tree according to certain embodiments.

FIG. 4 depicts a flowchart 400 that provides a high level solution to the foregoing questions according to certain embodiments. Flowchart 400 assumes that BBST T (which is used to implement dynamic search data structure D described above) stores in each node a record of the current height of that node in T, where "height" indicates how close the node is to the tree root (with higher height values being closer to the root and lower height values being farther from the root). The specific nature of this height parameter may differ depending on the type of BBST T; for instance, in the case of a LLRBT or another type of red-black tree, this height parameter can specifically refer to "black-height," which is the "black-depth" of the overall tree (i.e., the number of black edges along the longest root-to-leaf path of the tree) minus the node's black-depth (i.e., the number of black edges from the root to that node). By way of example, with respect to LLRBT 300 shown in FIG. 3, the black-height of the node identified by key 5 (reference numeral 302) is 1 because the tree's black-depth is 4 and the node's black-depth is 3. Further, the black-height of the node identified by key 22 (reference numeral 304) is 3 because the tree's black-depth is 4 and the node's black-depth is 1. For other types of BBSTs, other notions of height may be used.

Starting with step 402 of flowchart 400, dynamic search component 110 can receive a request to insert or delete a key into/from BBST T. In response, dynamic search component 110 can execute the Insert or Delete operation in accordance with a conventional implementation of the BBST, which may involve rotating one or more nodes to maintain tree balance (step 404). These rotations may also change the height of a subset of the nodes. In the case of an insert, the new node may initially be placed either in fast memory tier 106(2) or slow memory tier 106(1).

Then, once the insert or delete operation is complete, dynamic search component 110 can rearrange BBST T—or in other words, move the nodes of T between the fast and slow memory tiers as needed—to ensure the following property: a threshold number of nodes of highest height in T (e.g., the m highest height nodes) are stored in fast memory tier 106(2) and the remaining nodes are stored in slow memory tier 106(1)) (step 406). Because all dynamic search operations on BBST T involve performing a single spine traversal on the tree, by maintaining this property dynamic search component 110 can guarantee that most memory accesses for the dynamic search task are executed in fast memory, resulting in a speed up over implementing the standard algorithm.

In particular, if the m nodes with highest height in BBST T are kept in fast memory tier 106(2) and the remaining n-m nodes of T are kept in slow memory tier 106(1), every root-to-leaf traversal will take at most $$O\left(C\log\frac{n}{m} + c\log m\right) = O(C\log\alpha + c\log m)$$

time, which is significantly faster than the worst case time complexity of the standard algorithm (i.e., O(C log n)). The mathematical reason for this is that the number of memory accesses in slow memory tier 106(1) is just logarithmic in the excess factor α rather than in the size of the entire tree (i.e., n). For example, in scenarios where n=m polylog(m) (which will be common in practice), the solution of flowchart 400 will require dynamic search component 110 to only perform O(log log n) memory accesses in slow memory tier 106(1), which is exponentially smaller than O(log n).

It should be noted that size m of fast memory tier 106(2) and size M of slow memory tier 106(2) are not necessarily the physical capacities of these memory tiers; rather, m and M are threshold memory sizes in tiers 106(2) and 106(1) respectively that dynamic search component 110 is authorized to use as part of executing the dynamic search task. In the scenario where dynamic search component 110 is the only consumer of tiers 106(2) and 106(1), m and M may be equal to their physical capacities. However, in alternative scenarios where other applications may concurrently access tiers 106(2) and 106(1), m and M may be less than the physical capacities of these tiers.

The remaining sections of this disclosure detail an efficient implementation of the high-level solution above in the scenario where BBST T is a LLRBT. It should be appreciated that FIGS. 1-4 are illustrative and not intended to limit embodiments of the present disclosure. For example, although dynamic search component 110 is shown as being implemented in software as part of application 108, in some embodiments the dynamic search techniques of the present disclosure may be implemented in hardware via a circuit such as a field-programmable gate array (FPGA) or an application-specific integrated circuit (ASIC). Further, although FIG. 1 depicts a particular arrangement of components within tiered memory system 100, other arrangements are possible (e.g., the functionality attributed to a particular component may be split into multiple components, components may be combined, etc.). Yet further, tiered memory system 100 may include other components or subcomponents that are not specifically described. One of ordinary skill in the art will recognize other variations, modifications, and alternatives.

3. LLRBT Implementation

Figure 5:
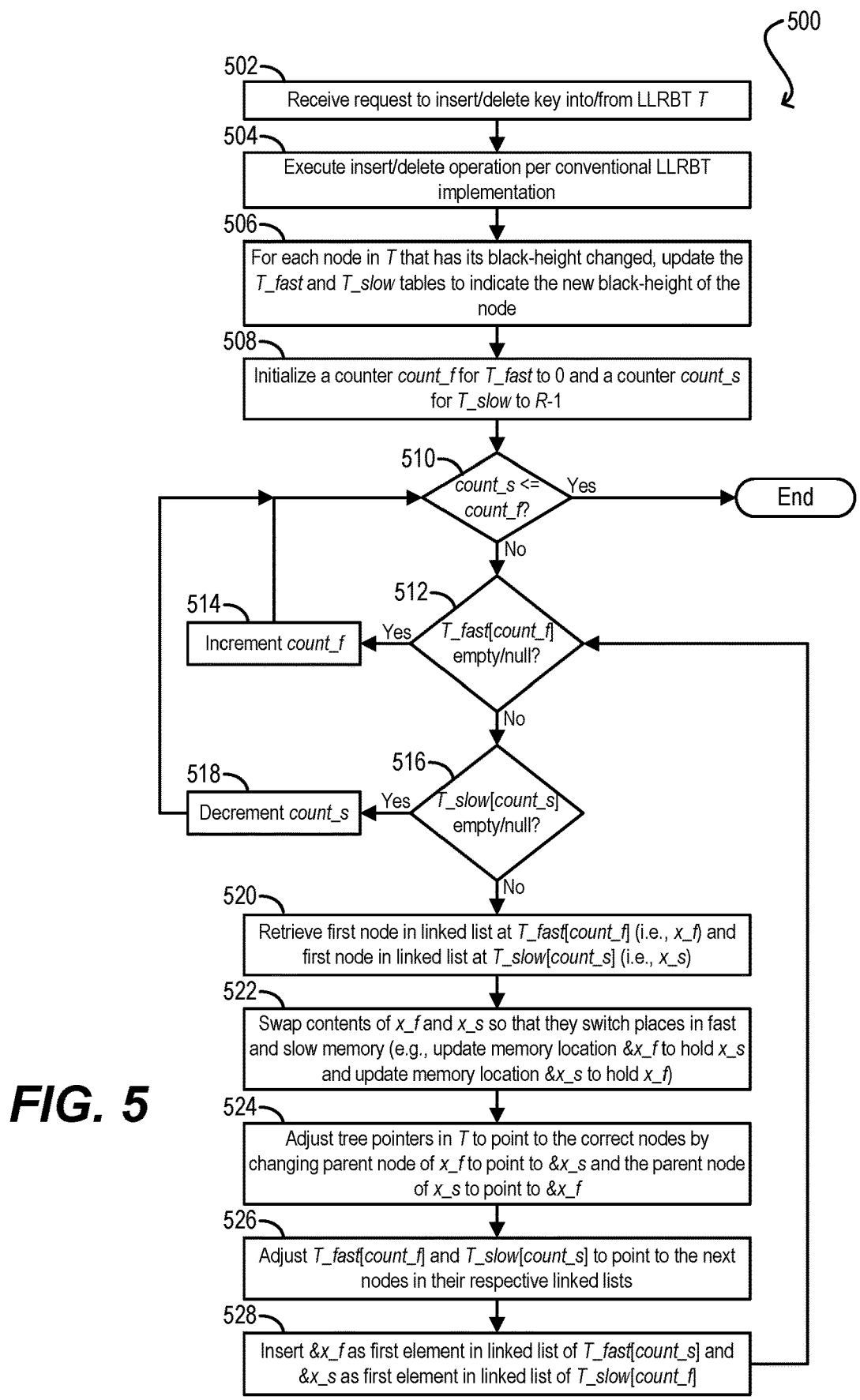
FIG. 5 depicts a flowchart for implementing tiered memory dynamic search using a left-leaning red-black tree according to certain embodiments.

FIG. 5 depicts a flowchart 500 that may be executed by dynamic search component 110 for efficiently implementing the high-level solution of FIG. 4 (i.e., keeping the m highest height nodes of BBST T in fast memory tier 106(2) as part of executing the dynamic search Insert and Delete operations) in the scenario where T is a LLRBT according to certain embodiments. It should be understood that flowchart 500 may also be applied to right-leaning red-black trees because the direction of the "lean" (i.e., the side with the red edge) does not matter.

Flowchart 500 assumes that LLRBT T stores in each node a record of the current black-height of that node in T. As mentioned previously, the black-height of a node in a LLRBT is the black-depth of the overall tree (i.e., the number of black edges along the longest root-to-leaf path of the tree) minus the node's black-depth (i.e., the number of black edges from the root to that node). Thus, if the black-depth of LLRBT T is 5 and the black-depth of a particular node N is 5, then the black-height of N will be 0.

Flowchart 500 further assumes that dynamic search component 110 maintains a data structure in fast memory tier 106(2) that is separate from LLRBT T and that comprises the following three components: (1) the tree's current node count n and fast memory size m, (2) a table T_fast configured to track the nodes of T currently stored in fast memory tier 106(2), and (3) a table T_slow configured to track the nodes of T currently stored in slow memory tier 106(1). In one set of embodiments, each table T_fast and T_slow can be implemented as an array of length R where R is an upper bound on the largest black-height of a node in the T, each array entry T_fast [r] can comprise a head pointer to a doubly linked list of all of the nodes of black-height r that are currently in fast memory tier 106(2), and each array entry T_slow [r] can comprise a head pointer to a doubly linked list of all of the nodes of black-height r that are currently in slow memory tier 106(1). These tables require only O(R) space in fast memory because the linked list pointers can be stored implicitly (i.e., in the nodes themselves).

The general intuition behind this implementation is that the nodes on the lower end of the T_fast table (i.e., nodes with lower black-height values that are currently in fast memory) are candidates for being moved to slow memory, and conversely the nodes on the higher end of the T_slow table (i.e., nodes with higher black-height values that are currently in slow memory) are candidates for being moved to fast memory. This is because the goal is to ensure that the m nodes of highest black-height are always maintained in fast memory tier 106(2). Accordingly, as part of the rearranging noted at step 406 of FIG. 4, this implementation essentially sweeps up the T_fast table (e.g., from array index 0 to R−1) and sweeps down the T_slow table (e.g., from array index R−1 to 0) to look for "inversions," or in other words scenarios where, for a given array index i, the T_fast table includes a node at an index j<i and the T_slow table includes a node at an index k>i. If such an inversion is found, the two nodes are swapped between the fast and slow memory tiers to ensure that the higher height node is placed in fast memory.

Starting with step 502 of flowchart 500, dynamic search component 110 can receive a request to insert or delete a key into/from LLRBT T. In response, dynamic search component 110 can execute the Insert or Delete operation in accordance with a conventional implementation of the LLRBT, which may involve rotating one or more nodes to maintain tree balance (step 504). These rotations may also change the height of a subset of the nodes. In the case of an insert, the new node may initially be placed either in fast memory tier 106(2) or slow memory tier 106(1). In a particular embodiment, the new node may initially be placed in fast memory tier 106(2) to accelerate certain key comparisons that are performed between that node and other nodes as part of the insert operation.

At step 506, for each node in LLRBT T that has its black-height changed as part of the operation processing at 504 (or for a newly inserted node), dynamic search component 110 can update the T_fast and/or T_slow tables accordingly to indicate the new black-height for the node. For example, if the black-height of a node N1 that is stored in slow memory tier 106(2) is changed from 3 to 2, dynamic search component 110 can remove N1 from the linked list pointed to by T_slow [3] and add it to the linked list pointed to by T_slow [2]. As another example, if a new node N2 is placed in fast memory tier 106(2) and inserted into LLRBT T at a black-height of 1, dynamic search component 110 can add N2 to the linked list pointed to by T_fast [1].

Once steps 504 and 506 are complete, dynamic search component 110 can carry out a rebalancing process to ensure that the m nodes of highest height in T are placed in fast memory by sweeping through the T_fast and T_slow tables and identifying and fixing inversions. In particular, at step 508, dynamic search component 110 can initialize two counters: a counter count_f for the T_fast table to 0 and a counter count_s for the T_slow table to R−1.

At step 510, dynamic search component 110 can check whether count_s is less than or equal count_f. If the answer is yes, the flowchart can end because no inversions are possible at this point.

If the answer at step 510 is no, dynamic search component 110 can further check whether T_fast[count_f] is empty/null (step 512). If the answer is yes (which means there are no nodes in fast memory at black-height count_f), dynamic search component 110 can increment count_f (step 514) and return to step 510.

If the answer at step 512 is no, dynamic search component 110 can further check whether T_slow [count_s] is empty/null (step 516). If the answer is yes (which means there are no nodes in slow memory at black-height count_s), dynamic search component 110 can decrement count_s (step 518) and return to step 510.

If the answers at steps 512 and 516 are both no, that means count_f<count_s and neither table is empty at these indices (and thus an inversion is detected). Accordingly, dynamic search component 110 can retrieve the first node in the linked list at T_fast [count_f] (denoted as x_f) and the first node in the linked list at T_slow [count_s] (denoted as x_s) (step 520). Assume &x_f is the location of x_f in fast memory and &x_s is the location of x_s in slow memory.

Dynamic search component 110 can then swap the contents of these nodes, so that they switch places in fast and slow memory (step 522). In other words, dynamic search component 110 can update memory location &x_f to hold the contents of x_s and update memory location &x_f to hold the contents of x_s.

Upon swapping the node contents, dynamic search component 110 can adjust the tree pointers in LLRBT T to point to the correct nodes by changing the parent node of x_s to point to its new location in fast memory (i.e., &x_f) and changing the parent node of x_f to point to its new location in slow memory (i.e., &x_s) (step 524).

Finally, dynamic search component 110 can adjust the T_fast and T_slow tables in view of the swapped nodes. In particular, at step 526, dynamic search component 110 can adjust T_fast [count_f] to point to the next node in its linked list and similarly adjust T_slow [count_s] to point to the next node in the linked list. In other words, T_fast[count_f] is set to x_f. next and T_slow [count_s] is set to x_s. next. Dynamic search component 110 can then insert &x_f as the first element of the linked list at T_fast [count_s] and insert &x_s as the first element of the linked list at T_slow [count_f] (step 528).

Once these steps are done, dynamic search component 110 can return to step 512 to re-check whether there are further nodes at T_fast[count_f] and T_slow[count_s] and the flowchart can continue until the end state is reached.

4. Resizing the T_fast and T_slow Tables

Due to ongoing insertions, the T_fast and T_slow tables used in the implementation above will need to be periodically resized in order to ensure that all of the black-heights in LLRBT T can be captured in these tables. In one set of embodiments, this resizing can be implemented by (1) identifying, upon completion of an insert operation, that the largest black-height in LLRBT T equals (or is close to)R, (2) creating new copies of the T_fast and T_slow tables in fast memory tier 106(2) that are twice the size of the existing tables, (3) and copying over the contents of the existing tables to the new, larger tables. Because one new node is inserted per insert operation, these steps have a time complexity of at most $O(c \log n)$ and thus will not negate the speed up achieved by the embodiments described above.

Certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   receiving, by computer system including first and second memory tiers, a request to insert or delete a key into or from a plurality of keys maintained by a dynamic search data structure, wherein the dynamic search data structure is implemented using a balanced binary search tree (BBST) comprising a plurality of nodes corresponding to the plurality of keys, wherein a first subset of the plurality of nodes are stored in the first memory tier, and wherein a second subset of the plurality of nodes are stored in the second memory tier;
   executing, by the computer system, the request to insert or delete the key, the executing resulting in a change in height of at least one node in the plurality of nodes; and
   in response to the executing, moving one or more nodes in the plurality of nodes between the first and second memory tiers, the moving causing a threshold number of nodes of highest height in the BBST to be stored in the first memory tier.

2. The method of claim 1 wherein the first memory tier is faster than the second memory tier.

3. The method of claim 1 wherein the threshold number is based on a size of the first memory tier.

4. The method of claim 1 wherein a height of each node is maintained in the BBST.

5. The method of claim 1 wherein the BBST is a left-leaning red-black tree (LLRBT) and wherein the moving causes m nodes of highest black-height in the LLRBT to be stored in the first memory tier;
   wherein m is the threshold number of nodes of highest height in the BBST to be stored in the first memory tier.

6. The method of claim 1 wherein the BBST is a LLRBT and wherein the moving comprises maintaining, in the first memory tier:
   a current node count of the LLRBT;
   the value m, wherein m is the threshold number of nodes of highest height in the BBST to be stored in the first memory tier;
   a first array of size R, wherein R is an integer greater than 0 and represents an upper bound on a largest black-height of a node in the LLRBT, and wherein each element of the first array points to a list of nodes in the LLRBT that are stored in the first memory tier and have a black-height corresponding to an index of the element; and
   a second array of size R, wherein each element of the second array points to a list of nodes in the LLRBT that are stored in the second memory tier and have a black-height corresponding to an index of the element.

7. The method of claim 6 wherein the moving further comprises:
   sweeping up the first array from array index 0 to R−1;
   sweeping down the second array from array index R−1 to 0; and
   for a given array index i, wherein i is an array index ranging from 0 to R−1:
      upon determining that the first array points to a first node in the first memory tier at an array index j<i and the second array points to a second node in the second memory tier at an array index k>i, swapping the first and second nodes between the first and second memory tiers, wherein j is an array index ranging from 0 to R−1, and k is an array index ranging from 0 to R−1.

8. A non-transitory computer readable storage medium having stored thereon program code executable by a computer system including first and second memory tiers, the program code embodying a method comprising:
   receiving a request to insert or delete a key into or from a plurality of keys maintained by a dynamic search data structure, wherein the dynamic search data structure is implemented using a balanced binary search tree (BBST) comprising a plurality of nodes corresponding to the plurality of keys, wherein a first subset of the plurality of nodes are stored in the first memory tier, and wherein a second subset of the plurality of nodes are stored in the second memory tier;
   executing the request to insert or delete the key, the executing resulting in a change in height of at least one node in the plurality of nodes; and
   in response to the executing, moving one or more nodes in the plurality of nodes between the first and second memory tiers, the moving causing a threshold number of nodes of highest height in the BBST to be stored in the first memory tier.

9. The non-transitory computer readable storage medium of claim 8 wherein the first memory tier is faster than the second memory tier.

10. The non-transitory computer readable storage medium of claim 8 wherein the threshold number is based on a size of the first memory tier.

11. The non-transitory computer readable storage medium of claim 8 wherein a height of each node is maintained in the BBST.

12. The non-transitory computer readable storage medium of claim 8 wherein the BBST is a left-leaning red-black tree (LLRBT) and wherein the moving causes m nodes of highest black-height in the LLRBT to be stored in the first memory tier;
    wherein m is the threshold number of nodes of highest height in the BBST to be stored in the first memory tier.

13. The non-transitory computer readable storage medium of claim 8 wherein the BBST is a LLRBT and wherein the moving comprises maintaining, in the first memory tier:
    a current node count of the LLRBT;
    the value m, wherein m is the threshold number of nodes of highest height in the BBST to be stored in the first memory tier;
    a first array of size R, wherein R is an integer greater than 0 and represents an upper bound on a largest black-height of a node in the LLRBT, and wherein each element of the first array points to a list of nodes in the LLRBT that are stored in the first memory tier and have a black-height corresponding to an index of the element; and
    a second array of size R, wherein each element of the second array points to a list of nodes in the LLRBT that are stored in the second memory tier and have a black-height corresponding to an index of the element.

14. The non-transitory computer readable storage medium of claim 13 wherein the moving further comprises:
    sweeping up the first array from array index 0 to R−1;
    sweeping down the second array from array index R−1 to 0; and
    for a given array index i, wherein i is an array index ranging from 0 to R−1:
       upon determining that the first array points to a first node in the first memory tier at an array index j<i and the second array points to a second node in the second memory tier at an array index k>i, swapping the first and second nodes between the first and second memory tiers, wherein j is an array index ranging from 0 to R−1, and k is an array index ranging from 0 to R−1.

15. A computer system comprising:
a processor;
a first memory tier and a second memory tier; and
a non-transitory computer readable medium having stored thereon program code that causes the processor to:
  receive a request to insert or delete a key into or from a plurality of keys maintained by a dynamic search data structure, wherein the dynamic search data structure is implemented using a balanced binary search tree (BBST) comprising a plurality of nodes corresponding to the plurality of keys, wherein a first subset of the plurality of nodes are stored in the first memory tier, and wherein a second subset of the plurality of nodes are stored in the second memory tier;
  execute the request to insert or delete the key, the executing resulting in a change in height of at least one node in the plurality of nodes; and
  in response to the executing, move one or more nodes in the plurality of nodes between the first and second memory tiers, the moving causing a threshold number of nodes of highest height in the BBST to be stored in the first memory tier.

16. The computer system of claim 15 wherein the first memory tier is faster than the second memory tier.

17. The computer system of claim 15 wherein the threshold number is based on a size of the first memory tier.

18. The computer system of claim 15 wherein a height of each node is maintained in the BBST.

19. The computer system of claim 15 wherein the BBST is a left-leaning red-black tree (LLRBT) and wherein the moving causes m nodes of highest black-height in the LLRBT to be stored in the first memory tier;
  wherein m is the threshold number of nodes of highest height in the BBST to be stored in the first memory tier.

20. The computer system of claim 15 wherein the BBST is a LLRBT and wherein the program code that causes the processor to move the one or more nodes comprises program code that causes the processor to maintain, in the first memory tier:
  a current node count of the LLRBT;
  the value m, wherein m is the threshold number of nodes of highest height in the BBST to be stored in the first memory tier;
  a first array of size R, wherein R is an integer greater than 0 and represents an upper bound on a largest black-height of a node in the LLRBT, and wherein each element of the first array points to a list of nodes in the LLRBT that are stored in the first memory tier and have a black-height corresponding to an index of the element; and
  a second array of size R, wherein each element of the second array points to a list of nodes in the LLRBT that are stored in the second memory tier and have a black-height corresponding to an index of the element.

21. The computer system of claim 20 wherein the program code that causes the processor to move the one or more nodes further comprises program code that causes the processor to:
  sweep up the first array from array index 0 to R−1;
  sweep down the second array from array index R−1 to 0; and
  for a given array index i, wherein i is an array index ranging from 0 to R−1:
    upon determining that the first array points to a first node in the first memory tier at an array index j<i and the second array points to a second node in the second memory tier at an array index k>i, swap the first and second nodes between the first and second memory tiers, wherein j is an array index ranging from 0 to R−1, and k is an array index ranging from 0 to R−1.

* * * * *